United States Patent
Miyata (10) Patent No.: US 11,636,991 B2
(45) Date of Patent: Apr. 25, 2023

(54) BREAKER, SAFETY CIRCUIT, AND SECONDARY BATTERY PACK

(71) Applicant: BOURNS KK, Osaka (JP)

(72) Inventor: Keitaro Miyata, Osaka (JP)

(73) Assignee: Bourns KK, Osaka (JP)

(*) Notice: Subject to any disclaimer, the term of this patent is extended or adjusted under 35 U.S.C. 154(b) by 0 days.

(21) Appl. No.: 17/059,172

(22) PCT Filed: May 29, 2019

(86) PCT No.: PCT/JP2019/021184
§ 371 (c)(1),
(2) Date: Nov. 25, 2020

(87) PCT Pub. No.: WO2019/230751
PCT Pub. Date: Dec. 5, 2019

(65) Prior Publication Data
US 2021/0366676 A1 Nov. 25, 2021

(30) Foreign Application Priority Data
May 30, 2018 (JP) .............................. JP2018-103848

(51) Int. Cl.
*H01H 37/52* (2006.01)
*H01H 37/04* (2006.01)

(52) U.S. Cl.
CPC ............ *H01H 37/52* (2013.01); *H01H 37/04* (2013.01)

(58) Field of Classification Search
CPC ........ H01H 37/04; H01H 37/52; H01H 37/54; H01H 37/5427; H01H 61/01; H01H 61/04;
(Continued)

(56) References Cited

U.S. PATENT DOCUMENTS 3,779,718 A * 12/1973 Maisner ................ C22C 38/105
428/617
4,131,720 A * 12/1978 Spengler .................. G12B 1/02
428/619
(Continued)

FOREIGN PATENT DOCUMENTS

CN 103999180 A 8/2014
JP 1-93019 A 4/1989
(Continued)

OTHER PUBLICATIONS

Tabei Shigeru, "Protector", Apr. 12, 1989, Tobu Electric Co. Ltd, Entire Document (Translation of JPH0193019) (of record, cited in the IDS, including Original Document). (Year: 1989).*
(Continued)

*Primary Examiner* — Stephen S Sul
(74) *Attorney, Agent, or Firm* — Knobbe, Martens, Olson & Bear LLP (57) ABSTRACT

A breaker includes a fixed piece having a fixed contact, a movable piece having an elastically deformable elastic portion and a movable contact formed at a tip portion of the elastic portion and pushed to contact with the fixed contact, a thermally actuated element deformable according to a temperature change to shift the state of the movable piece from a conductive state to a cut-off state, and a case accommodating the fixed piece, the movable piece, and the thermally actuated element. The movable piece is cantilevered by the case on a base end portion side of the elastic portion, the elastic portion includes a first narrow portion having a smaller width dimension in a short direction perpendicular to a longitudinal direction of the elastic portion than the base end portion, and the first narrow portion has an arc-shaped contour in plan view from a thickness direction of the elastic portion.

14 Claims, 5 Drawing Sheets

(58) Field of Classification Search
CPC .......... H01M 50/581; H01M 2200/101; Y02E 60/10
See application file for complete search history.

(56) References Cited

U.S. PATENT DOCUMENTS

| | | | | |
|---|---|---|---|---|
| 4,862,133 | A * | 8/1989 | Tabei | H01H 1/504 337/102 |
| 5,010,388 | A * | 4/1991 | Sasame | H01L 23/49811 257/E23.068 |
| 5,497,286 | A * | 3/1996 | Shimada | H01H 81/02 337/380 |
| 6,448,883 | B1 * | 9/2002 | Hofsass | H01H 1/50 337/342 |
| 9,460,876 | B2 | 10/2016 | Namikawa | |
| 2013/0299323 | A1 * | 11/2013 | Tanaka | H01H 1/2075 200/244 |
| 2013/0323547 | A1 * | 12/2013 | Namikawa | H01H 37/5427 429/61 |
| 2014/0285308 | A1 * | 9/2014 | Namikawa | H01H 37/04 337/1 |
| 2014/0334055 | A1 * | 11/2014 | Namikawa | H01H 37/04 361/115 |
| 2015/0311018 | A1 * | 10/2015 | Tanaka | H01H 37/54 337/343 |
| 2016/0035521 | A1 * | 2/2016 | Namikawa | H01H 37/5427 337/380 |
| 2016/0035522 | A1 * | 2/2016 | Namikawa | H01H 37/52 337/362 |

FOREIGN PATENT DOCUMENTS

| | | |
|---|---|---|
| JP | 2016-35822 A | 3/2016 |
| JP | 2017-103118 A | 6/2017 |
| WO | WO 2011/105175 A1 | 9/2011 |

OTHER PUBLICATIONS

International Search Report for PCT/JP2019/021184 dated Aug. 27, 2019.

* cited by examiner

BREAKER, SAFETY CIRCUIT, AND SECONDARY BATTERY PACK

TECHNICAL FIELD

The present invention relates to a small breaker or the like suitable for use in a safety circuit of an electrical device.

BACKGROUND ART

Conventionally, breakers have been used as protective devices (safety circuits) for secondary batteries and motors and the like of various electric devices. The breaker shuts off current to protect the secondary battery, the motor, and the like when an abnormality occurs, such as when the temperature of the secondary battery rises excessively during charging/discharging, or when an overcurrent flows through the motor and the like, which is installed in equipment such as automobiles and home appliances. In order to ensure the safety of the equipment, the breaker used as such a protective device must be able to follow temperature changes and operate accurately (having good temperature characteristics) and have a stable resistance when energized.

The breaker is provided with a thermally actuated element that operates in response to temperature changes and conducts or interrupts the current. Patent Document 1 has disclosed a breaker in which a bimetal is used as the thermally actuated element. A bimetal is an element which is formed by laminating two types of plate-shaped metal materials having different coefficients of thermal expansion, and controls the conduction state of the contacts by changing its shape in response to changes in temperature. In the breaker shown in the document, parts such as a fixed piece, a terminal piece, a movable piece, a thermally actuated element, a PTC thermistor are housed in a case, and the terminals of the fixed piece and terminal piece protrude from the case and are connected to the electrical circuit of an electrical device for use.

Further, when a breaker is used as a protective device for a secondary battery or the like equipped in an electrical device such as a notebook personal computer, a tablet-type portable information terminal device, or a thin, multifunctional mobile phone called a smartphone, miniaturization is required in addition to ensuring safety as described above. In particular, in recent years, users have been particularly interested in miniaturized (thinner) mobile devices, and devices newly released from a number of manufacturers have tended to be designed to be smaller in order to secure a design advantage. Against this background, there is a strong demand for further miniaturization of the breaker, which is implemented along with a secondary battery as a component of a portable information terminal device.

PRIOR ART

Patent Literature

Patent Document 1: WO2011/105175

SUMMARY OF THE INVENTION

Problems to be Solved by the Invention

In recent electrical devices, breakers with low electrical resistance and large current capacity when energized are desired for improving the performance and shortening the charging time of secondary batteries. In order to realize such a breaker, it is effective to suppress contact resistance between a fixed contact and a movable contact as well as to decrease conduction resistance of the movable piece itself by, for example, increasing thickness of the movable piece.

However, in the case of a breaker to which the movable piece with an increased thickness is applied, it is possible that the thermally actuated element is damaged during repeated operation of the breaker because of the increased stress on the thermally actuated element when the movable piece is shifted from a conductive state to a cut-off state.

The damage to the above-mentioned thermally actuated element can be suppressed by applying a thermally actuated element having a large diagonal length in the breaker in which the force to push up the movable piece is large, that is the breaker disclosed in Patent Document 1. However, such a thermally actuated element leads to increased case size, which is one of the factors that hinder the miniaturization of the breaker.

The present invention has been made in order to solve the above-described problem, and a primary object thereof is to provide a breaker capable of easily decreasing electrical resistance during energization without enlarging the case. Further, another object of the present invention is to provide a breaker capable of preventing damage or deformation of the movable piece even after the movable piece is repeatedly shifted between the conductive state and the cut-off state.

Means for Solving the Problem

In order to achieve the above objects, the present invention is a breaker including a fixed piece having a fixed contact, a movable piece having a plate-shaped and elastically deformable elastic portion and a movable contact which is formed at a tip portion of the elastic portion and is pushed to be in contact with the fixed contact, a thermally actuated element which deforms in accordance with a temperature change to thereby shift the state of the movable piece from a conductive state in which the movable contact is in contact with the fixed contact to a cut-off state in which the movable contact is separated from the fixed contact, and a case which accommodates the fixed piece, the movable piece, and the thermally actuated element, wherein the movable piece is cantilevered and supported by the case on a base end portion side of the elastic portion, the elastic portion includes a first narrow portion having a smaller width dimension in a short direction perpendicular to a longitudinal direction of the elastic portion than that of the base end portion, and the first narrow portion has an arc-shaped contour in a plan view seen from a thickness direction of the elastic portion.

In the breaker according to the present invention, it is preferred that the width dimension of the first narrow portion is gradually and continuously decreased with respect to the base end portion.

In the breaker according to the present invention, it is preferred that the elastic portion is provided with a first protrusion protruding toward the thermally actuated element on the base end portion side to be in contact with the thermally actuated element in the cut-off state, and a second protrusion protruding toward the thermally actuated element on the tip portion side of the first protrusion to be in contact with the thermally actuated element in the cut-off state, and an end edge on the base end portion side of the first narrow portion is arranged between the first protrusion and the second protrusion.

In the breaker according to the present invention, it is preferred that a minimum width portion, at which the width dimension of the first narrow portion is the smallest, is located on the base end portion side of a middle in the longitudinal direction between the first protrusion and the second protrusion.

In the breaker according to the present invention, it is preferred that a positive temperature coefficient thermistor is provided between the fixed piece and the thermally actuated element to conduct the fixed piece and the thermally actuated element, the fixed piece is provided with a third protrusion protruding toward the thermally actuated element on the base end portion side to be in contact with the thermally actuated element, and a fourth protrusion protruding toward the thermally actuated element on the tip portion side from the third protrusion to be in contact with the thermally actuated element, and the minimum width portion is located between the third protrusion and the fourth protrusion.

In the breaker according to the present invention, it is preferred that the elastic portion has a second narrow portion, which has the width dimension smaller than the first narrow portion, arranged on the tip portion side of the first narrow portion, and the movable contact is formed in the second narrow portion.

The safety circuit for an electrical device according to the present invention includes the above-described breaker.

A secondary battery pack for an electrical device according to the present invention includes the above-described breaker.

Advantageous Effects of the Invention

According to the breaker of the present invention, the movable piece is cantilevered and supported by the case on the base end portion side of the elastic portion, and the elastic portion includes the first narrow portion which has the width dimension smaller than the base end portion in the short direction perpendicular to the longitudinal direction of the elastic portion, therefore, an elastic force (bending rigidity) is decreased. Thereby, even in the case in which the movable piece having the increased thickness is used, the force required to push up the movable piece is decreased, therefore, the stress on the thermally actuated element when shifting the state of the movable piece from the conductive state to the cut-off state is suppressed. Thereby, the electrical resistance during energization can be easily decreased without using the thermally actuated element with a large diagonal length.

Furthermore, the first narrow portion has the arc-shaped contour in a plan view seen from the thickness direction of the elastic portion. Thereby, the stress concentration on the first narrow portion is moderated, therefore, it is possible that the movable piece is prevented from being damaged or deformed even after the movable piece performs repeated operations of shifting between the conductive state and the cut-off state.

BRIEF DESCRIPTION OF THE DRAWINGS

FIG. 3 A cross-sectional view of the above-described breaker in an overcharged state or an abnormal state and the like.

DESCRIPTION OF THE PREFERRED EMBODIMENT

Figure 1:
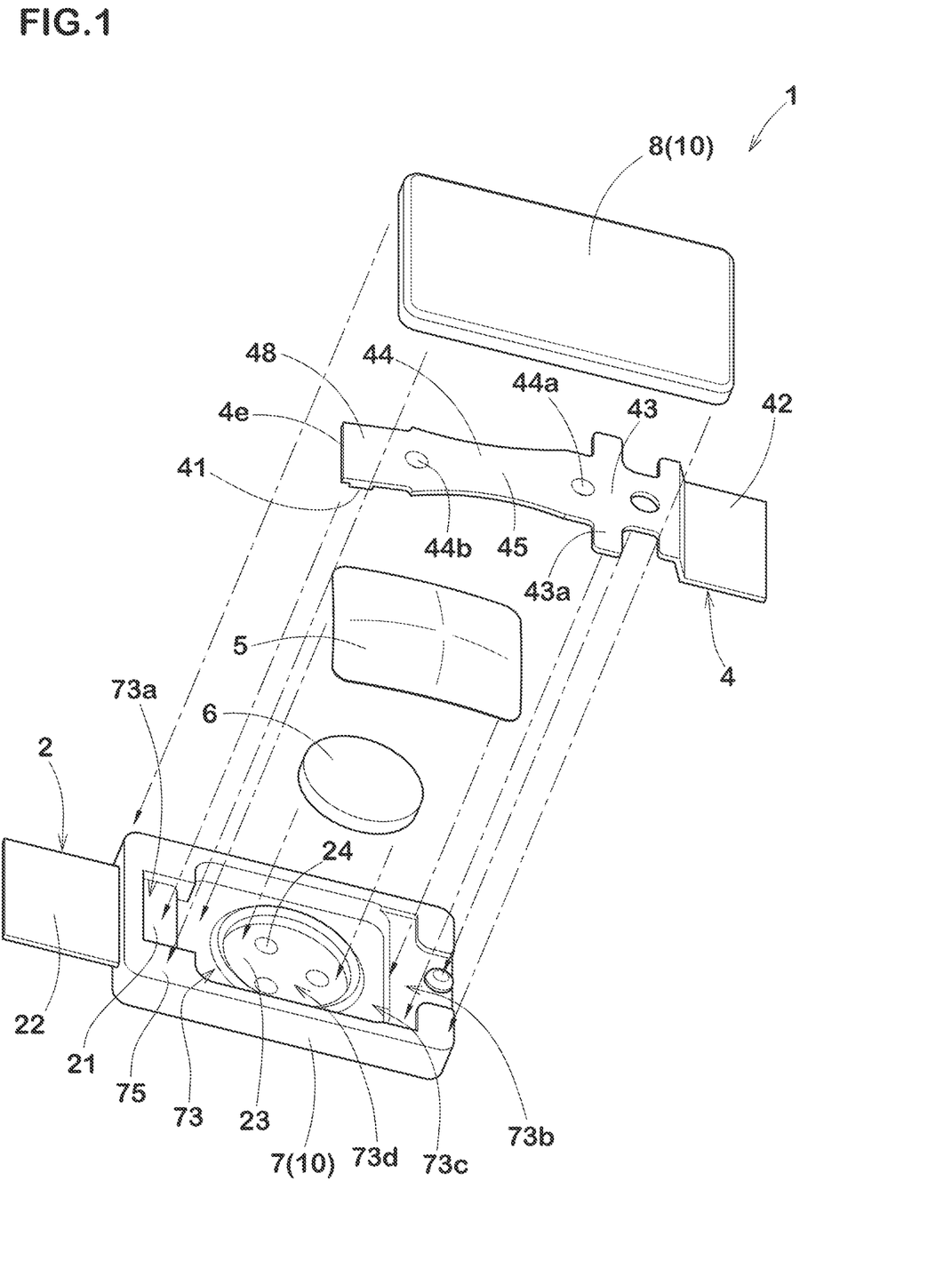
FIG. 1 A perspective view showing a schematic configuration before assembly of a breaker according to one embodiment of the present invention.
Figure 2:
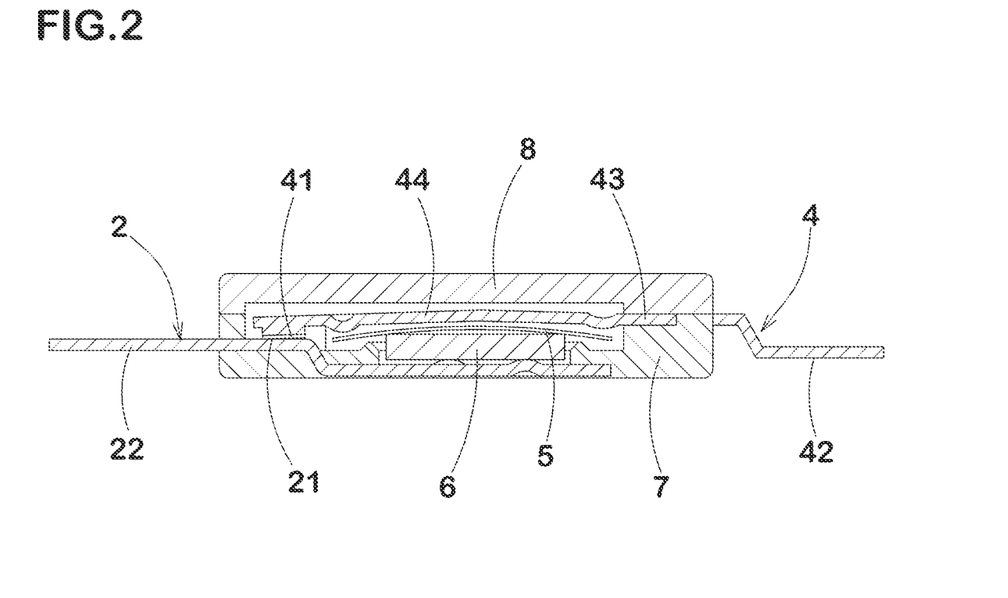
FIG. 2 A cross-sectional view of the above-described breaker in normal charge or discharge states.
Figure 3:
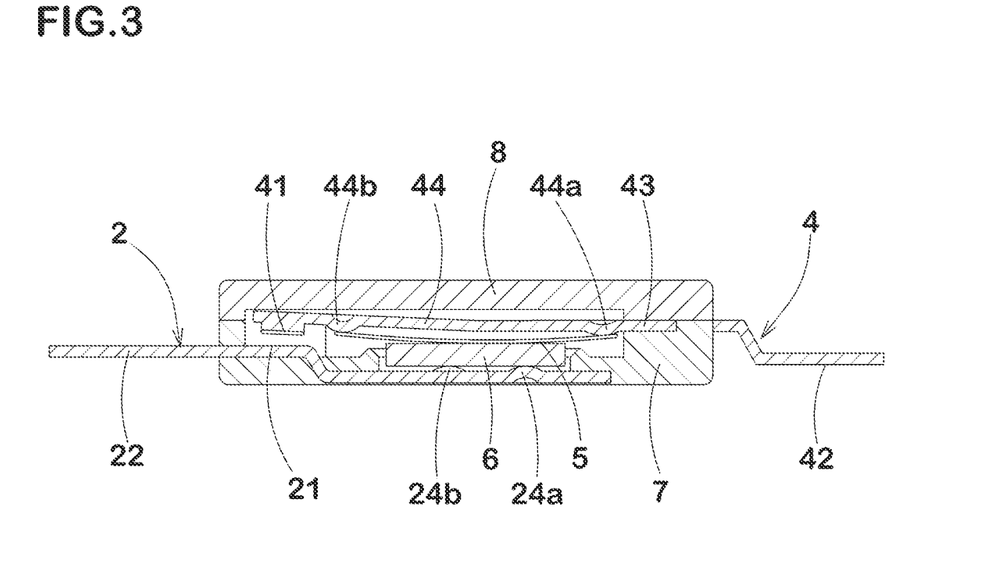

A breaker according to an embodiment of the present invention will be described with reference to the drawings. FIGS. 1 to 3 show the configuration of a breaker 1. The breaker 1 is implemented in an electrical device or the like and protects the electrical device from an excessive temperature rise or overcurrent.

The breaker 1 is formed by a fixed piece 2 having a fixed contact 21, a movable piece 4 having a movable contact 41 at a tip portion (4e) thereof, a thermally actuated element 5 which deforms in accordance with a temperature change, and a PTC (Positive Temperature Coefficient) thermistor 6, a case 10 for housing the fixed piece 2, the movable piece 4, the thermally actuated element 5, and the PTC thermistor 6, and the like. The case 10 is formed by a case main body (first case) 7 and a lid member (second case) 8 to be attached to the upper surface of the case main body 7, and the like.

The fixed piece 2 is formed by, for example, pressing a metal plate mainly composed of copper or the like (in addition, a metal plate of copper-titanium alloy, nickel silver, or brass, etc.) and is embedded in the case main body 7 by insert molding. The fixed piece 2 has a terminal 22 which is formed on one end thereof and is to be electrically connected with an external circuit and a support portion 23 which is formed on the other end and supports the PTC thermistor 6. The PTC thermistor 6 is placed on protrusions (dowels) 24 formed in a convex manner at three locations in the support portion 23 of the fixed piece 2 and is supported by the protrusions 24. Since the fixed piece 2 is bent in a staircase shape, the fixed contact 21 and the support portion 23 are arranged in a stepwise manner, therefore, a space for storing the PTC thermistor 6 is easily secured.

The fixed contact 21 is formed at a position facing the movable contact 41 by cladding, plating, coating, or the like of a conductive material such as silver, nickel, nickel-silver alloy, and also copper-silver alloy, gold-silver alloy, and is exposed through a part of an opening (73a) formed inside the case main body 7. The terminal 22 protrudes outward from an end edge of the case main body 7. The support portion 23 is exposed through an opening (73d) formed inside the case main body 7.

In the present application, unless otherwise noted, in the fixed piece 2, the surface on the side where the fixed contact 21 is formed (that is, the upper surface in FIG. 1) is described as a front surface and the opposite surface as a rear surface. If the direction from the fixed contact 21 to the movable contact 41 is defined as a first direction and the opposite direction is defined as a second direction, then the front surface faces the first direction and the rear surface faces the second direction. The same applies to other components such as the movable piece 4, the thermally actuated element 5, the PTC thermistor 6, and the like, for example.

The movable piece 4 is formed in an arm shape symmetrical with respect to a center line along the longitudinal direction by pressing a plate-shaped metal material mainly composed of copper or the like.

The movable contact 41 is formed at the tip portion (4e) in the longitudinal direction of the movable piece 4. The movable contact 41 is formed of, for example, an equivalent material to that of the fixed contact 21 and is joined to the tip portion (4e) of the movable piece 4 by a method such as clad, crimping, and the like in addition to welding.

A terminal 42 which is to be electrically connected to an external circuit is formed at the other end in the longitudinal direction of the movable piece 4. The movable piece 4 has a contact portion 43 and an elastic portion 44 arranged between the movable contact 41 and the terminal 42. The contact portion 43 contacts the case main body 7 and the lid member 8 between the terminal 42 and the elastic portion 44. The contact portion 43 has protruding portions (43a) which protrude in a wing shape in a short direction of the movable piece 4. Due to the provision of the protruding portion (43a), the contact portion 43 is sandwiched by the case main body 7 and the lid member 8 in a wide and large area, firmly fixed to the case 10.

The elastic portion 44 extends from the contact portion 43 toward the movable contact 41. The movable piece 4 is cantilevered and supported by the case 10 at the contact porin 43 on a base end portion (44s) (see FIG. 4) side of the elastic portion 44, and the elastic portion 44 is elastically deformed in this state, so that the movable contact 41 formed at the tip portion of the elastic portion 44 (the tip portion (4e) of the movable piece 4) is pressed toward the fixed contact 21 and brought into contact with the fixed contact 21, therefore, the fixed piece 2 and the movable piece 4 can be energized.

The movable piece 4 is curved or bent in the elastic portion 44 by pressing. The degree of curvature or bending is not particularly limited as long as the thermally actuated element 5 can be accommodated, and may be set as appropriate in consideration of the elastic force, the contact pressure, and the like at the reversal operation temperature and the positive return temperature. Further, a pair of protrusions (44a) and (44b) are formed on a lower surface of the elastic portion 44 so as to face the thermally actuated element 5. The first protrusion (44a) protrudes toward the thermally actuated element 5 on the base end portion (44s) side and contacts the thermally actuated element 5 in the cut-off state. The second protrusion (44b) protrudes toward the thermally actuated element 5 on the tip portion side (that is, on the movable contact 41 side) of the first protrusion (44a) and contacts the thermally actuated element 5 in the cut-off state. When the thermally actuated element 5 is deformed due to overheating, the thermally actuated element 5 contacts the first protrusion (44a) and the second protrusion (44b), therefore, the deformation of the thermally actuated element 5 is transmitted to the elastic portion 44 via the first protrusion (44a) and the second protrusion (44b), thereby, the tip portion of the movably: piece 4 is pushed up. (See FIG. 3).

The thermally actuated element 5 shifts the state of the movable piece 4 from the conductive state in which the movable contact 41 is in contact with the fixed contact 21 to the cut-off state in which the movable contact 41 is separated from the fixed contact 21. The thermally actuated element 5 has an initial shape having an arc-shaped cross section and is formed by laminating thin plates having different coefficients of thermal expansion. Upon reaching the operating temperature due to overheating, the curved shape of the thermally actuated element 5 is warped in reverse with a snap motion, and is restored when the temperature falls below the reset temperature due to cooling. The initial shape of the thermally actuated element 5 can be formed by pressing. As long as the elastic portion 44 of the movable piece 4 is pushed up by the reverse warping action of the thermally actuated element 5 at the desired temperature and is restored by the elastic force of the elastic portion 44, the material and shape of the thermally actuated element 5 are not particularly limited, however, it is preferred that the thermally actuated element has a rectangular shape from the point of view of productivity and efficiency of the reverse warping operation, and it is preferred that it has a rectangular shape close to a square in order to efficiently push up the elastic portion 44 while being small.

As the material of thermally actuated element 5, a laminate of two types of materials having different coefficients of thermal expansion made of various alloys such as nickel silver, brass, and stainless steel, and the like are used in combination according to the required conditions. For example, as a material of the thermally actuated element 5 which can obtain the stable operating temperature and the reset temperature, it is preferred to use a combination of a copper-nickel-manganese alloy on the high expansion side and an iron-nickel alloy on the low expansion side. Further, a more preferred material from the point of view of chemical stability includes a combination of iron-nickel-chromium alloy on the high expansion side and iron-nickel alloy on the low expansion side. Furthermore, an even more preferred material from the point of view of chemical stability and processability includes a combination of an iron-nickel-chromium alloy on the high expansion side and an iron-nickel-cobalt alloy on the low expansion side.

The PTC thermistor 6 conducts the fixed piece 2 and the movable piece 4 when the movable piece 4 is in the cut-off state. The PTC thermistor 6 is arranged between the fixed piece 2 and the thermally actuated element 5. That is, the support portion 23 of the fixed piece 2 is located right under the thermally actuated element 5 with the PTC thermistor 6 in between. The current flowing through the PTC thermistor 6 is increased when the energization of the fixed piece 2 and the movable piece 4 is cut off by the reverse warping operation of the thermally actuated element 5. As long as the PTC thermistor 6 is a positive temperature coefficient thermistor which limits the current by increasing the resistance value as the temperature increases, the type of the PTC thermistor 6 can be selected according to the requirements such as operating current, operating voltage, operating temperature, reset temperature, and the like, and the materials and the shape are not particularly limited as long as these properties are not impaired. In the present embodiment, a ceramic sintered body containing barium titanate, strontium titanate or calcium titanate is used. In addition to the ceramic sintered body, so-called polymer PTC in which conductive particles such as carbon and the like are contained in the polymer may be used.

The case main body 7 and the lid member 8 which constitute the case 10 are formed of a thermoplastic resin such as flame retardant polyamide, and polyphenylene sulfide (PPS), liquid crystal polymer (LCP), and polybutylene terephthalate (PBT) having excellent heat resistance, and the like. Materials other than the resin may be used as long as the characteristics equal to or higher than those of the resin described above can be obtained.

The case main body 7 is formed with a housing concave portion 73, which is an internal space for housing the movable piece 4, the thermally actuated element 5, the PTC thermistor 6, and the like. The housing concave portion 73 has the openings (73a) and (73b) for housing the movable piece 4, an opening (73c) for housing the movable piece 4 and the thermally actuated element 5, and the opening (73d)

for housing the PTC thermistor 6, and the like. It should be noted that end edges of the movable piece 4 and the thermally actuated element 5 incorporated in the case main body 7 are each brought into contact with a frame formed inside the housing concave portion 73, and are guided during the reverse warp of the thermally actuated element 5.

The lid member may have a metal plate mainly formed of copper and the like or a metal plate of stainless steel and the like embedded by insert molding. The metal plate appropriately contacts with the front surface of the movable piece 4 to restrict the movement of the movable piece 4, and contributes to the miniaturization of the breaker 1 while increasing the rigidity and the strength of the lid member 8, and consequently those of the case 10 as a housing body.

As shown in FIG. 1, the lid member 8 is attached to the case main body 7 so as to close the openings (73a), (73b), (73c), and so on of the case main body 7 which accommodates the fixed piece 2, the movable piece 4, the thermally actuated element 5, the PTC thermistor 6, and the like. The case main body 7 and the lid member 8 are joined together by ultrasonic welding, for example.

FIGS. 2 and 3 schematically show the operation of the breaker 1. FIG. 2 shows the operation of the breaker 1 in normal charge or discharge states. In the normal charge or discharge states, the thermally actuated element 5 retains its initial shape before the reverse warping. Through the fixed contact 21, the movable contact 41, the elastic portion 44 of the movable piece 4, and the like, both terminals 22 and 42 of the breaker 1 are electrically connected.

As shown in FIG. 2, the thermally actuated element 5 may be separated from the first protrusion (44a) and the second protrusion (44b) of the movable piece 4 in the conductive state. Thereby, the contact pressure between the movable contact 41 and the fixed contact 21 is increased, and the contact resistance between them is decreased.

FIG. 3 shows the operation of the breaker 1 in an overcharged state or an abnormal state and the like. When the temperature becomes high due to overcharging or abnormality, the thermally actuated element 5 reaches the operating temperature and the thermally actuated element 5 warps backwards to come into contact with the elastic portion 44 of the movable piece 4, then the elastic portion 44 is pushed up, thereby, the fixed contact 21 and the movable contact 41 are separated from each other. At this point, the current flowing between the fixed contact 21 and the movable contact 41 is interrupted. On the other hand, the thermally actuated element 5 comes into contact with the movable piece 4 and a small amount of leakage current flows through the thermally actuated element 5 and the PTC thermistor 6. That is, the PTC thermistor 6 conducts the fixed piece 2 and the movable piece 4 through the thermally actuated element 5, which shifts the movable piece 4 to the cut-off state. The PTC thermistor 6 continues to generate heat as long as such leakage current flows, and greatly increases the resistance while maintaining the thermally actuated element 5 in the reverse warped state, therefore, no current flows through the path between the fixed contact 21 and the movable contact 41, and only the slight leakage current described above is present (which constitutes a self-holding circuit). This leakage current can be used for other functions of the safety device.

When the overcharged state is released or the abnormal state is resolved, the heat generation by the PTC thermistor 6 also subsides and the thermally actuated element 5 returns to the reset temperature and restores its initial shape. Then, due to the elastic force of the elastic portion 44 of the movable piece 4, the movable contact 41 and the fixed contact 21 come into contact with each other again, thereby, the cut-off state is released so that the circuit returns to the conductive state shown in FIG. 2.

Figure 4:
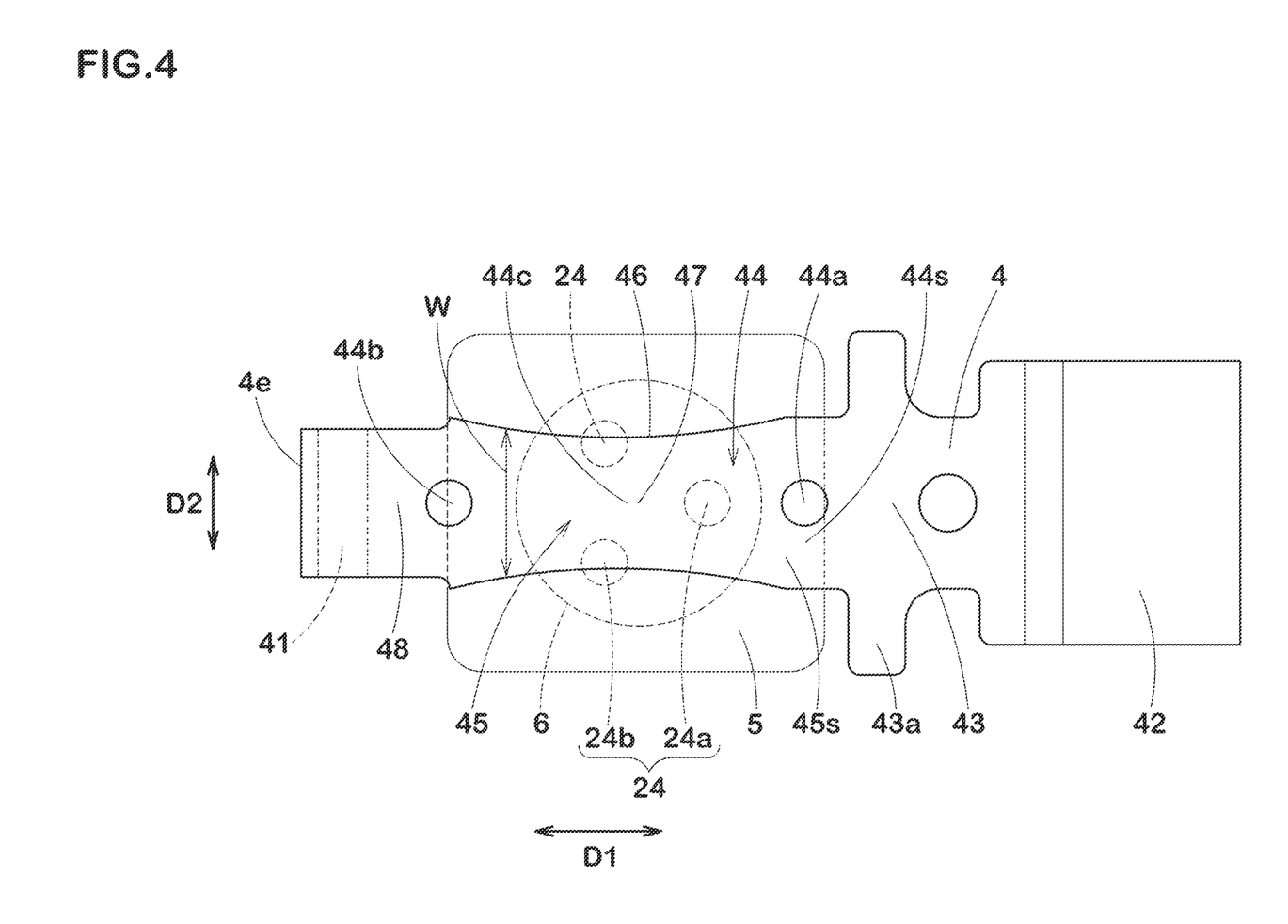
FIG. 4 A plan view of a movable piece of the above-described breaker.

FIG. 4 shows the movable piece 4. As already mentioned, in order to realize the breaker 1 which has low electrical resistance when energized, it is effective to suppress the contact resistance between the fixed contact 21 and the movable contact 41 by increasing the cross-sectional area of the movable piece 4, as well as to reduce the conduction resistance of the movable piece 4 itself. However, as the cross-sectional area of the movable piece 4, especially the thickness thereof, increases, the elastic force (bending rigidity) of the elastic portion 44 also increases, therefore, the stress on the thermally actuated element 5 also increases.

Therefore, in the breaker 1 of the present invention, a first narrow portion 45 is provided in the elastic portion 44 of the movable piece 4. The first narrow portion 45 is formed to have a width dimension (W) smaller than that of the base end portion (44s). Here, the "width dimension (W)" is the length in the short direction (D2) perpendicular to the longitudinal direction (D1) of the elastic portion 44. The base end portion (44s) includes a region extending in the longitudinal direction (D1) with the constant width dimension (W). The width dimension of the base end portion (44s) is defined by the width dimension (W) of the above region.

Due to the fact that the elastic portion 44 includes the first narrow portion 45, the elastic force (the bending rigidity) of the elastic portion 44 is decreased. Thereby, even in the case in which the movable piece 4 having the increased thickness is used, the force required to push up the movable piece 4 is decreased, therefore, the stress on the thermally actuated element 5 when shifting the state of the movable piece 4 from the conductive state to the cut-off state is suppressed. Thereby, the electrical resistance during energization can be easily decreased without using the thermally actuated element 5 with a large diagonal length.

Furthermore, the first narrow portion 45 has an arc-shaped contour 46 in a plan view seen from the thickness direction of the elastic portion 44. Here, "arc" is a concept that includes not only part of the circumference of a perfect circle but also part of the circumference of an ellipse. Since the first narrow portion 45 has the arc-shaped contour 46 in a plan view, the stress concentration on the first narrow portion 45 is relieved, therefore, it is possible that the movable piece 4 is prevented from being damaged or deformed even after the movable piece 4 performs repeated operations of shifting between the conductive state and the cut-off state.

In the first narrow portion 45 of the present embodiment, since the width dimension (W) is gradually and continuously decreased with respect to the base end portion (44s), the stress concentration on the first narrow portion 45 is further relieved, therefore, the electrical resistance during energization of the breaker 1 is stabilized.

It is preferred that an end edge (45s) on the base end portion (44s) side of the first narrow portion 45 is arranged between the first protrusion (44a) and the second protrusion (44b). Therefore, the contact resistance between the fixed contact 21 and the movable contact 41 can be easily suppressed.

It is preferred that a minimum width portion 47, at which the width dimension (W) of the first narrow portion 45 is the smallest, is located on the base end portion (44s) side of a middle (44c) in the longitudinal direction between the first protrusion (44a) and the second protrusion (44b). The minimum width portion 47 is the most deformed portion of the elastic portion 44 in the cut-off state. Since the minimum width portion 47 is located on the base end portion (44s) side of the above-described middle (44c) between the first protrusion (44a) and the second protrusion (44b), the force required to push up the movable piece 4 when shifting from the conductive state to the cut-off state is decreased, thereby, the stress on the thermally actuated element 5 is suppressed.

As shown in FIG. 4, the protrusions 24 of the fixed piece 2 includes a third protrusion (24a) and a fourth protrusion (24b). The third protrusion (24a) protrudes toward the thermally actuated element 5 on the base end portion (44s) side to be in contact with the rear surface of the thermally actuated element 5. The fourth protrusion (24b) protrudes toward the thermally actuated element 5 on the tip portion (4e) side of the movable piece 4 from the third protrusion (24a) to be in contact with the rear surface of the thermally actuated element 5. In the present embodiment, a pair of the fourth protrusions (24b) are provided on the tip portion (4e) side, however, a pair of the third protrusions (24a) may be provided on the base end portion (44s) side.

It is preferred that the minimum width portion 47 is located between the third protrusion (24a) and the fourth protrusions (24b) in the longitudinal direction (D1) of the elastic portion 44. Thereby, the force with which the movable piece 4 pushes the thermally actuated element 5 is transferred to the third protrusion (24a) and the fourth protrusions (24b) equally through the PTC thermistor 6 when the movable piece 4 is in the cut-off state. Therefore, the posture of the thermally actuated element 5 and the PTC thermistor 6 is stabilized.

In the breaker 1 of the present embodiment, the elastic portion 44 has a second narrow portion 48, which has a smaller width dimension than the first narrow portion 45, on the tip portion (4e) side of the first narrow portion 45. The movable contact 41 is formed in the second narrow portion 48. The width dimension of the second narrow portion 48 may be formed smaller than the width dimension of the minimum width portion 47 of the first narrow portion 45. Due to the second narrow portion 48 configured as such, the opening (73a) for accommodating the second narrow portion 48 and the movable contact 41 can be made small, therefore, a large area of an adhering surface 75 (see FIG. 1) for adhering with the lid member 8 can be secured in the vicinity of the opening (73a.)

It is preferred that the shape of the first narrow portion 45 is formed symmetrically with respect to a center line along the longitudinal direction (D1). According to the elastic portion 44 having the first narrow portion 45 configured as such, the twisting of the elastic portion 44 accompanying the operation of the breaker 1 is suppressed, therefore, the decrease in strength of the elastic portion 44 can be suppressed.

EXAMPLE

In the breaker 1 of the present invention, which includes the first narrow portion 45 in the elastic portion 44 of the movable piece 4, the increase in contact resistance between the fixed contact 21 and the movable contact 41 is a concern. Twenty breakers each provided with the movable piece 4 shown in FIG. 4 (FIG. 7) were made by way of test according to the specifications in Tables 1 and 2, and then the electrical resistance between the terminals 22 and 42 was measured for each.

The specifications of the movable pieces 4 made by way of test were as follows. Each of the movable pieces 4 was cut from a copper plate having a thickness of 0.15 mm of EFTEC-550E available from Furukawa Electric Co. A length (L1) shown in FIG. 7 in the longitudinal direction (D1) between the contact portion 43 side base end of the elastic portion 44 and a center of the movable contact 41 is 4.43 mm, and a width (L2) in the short direction (D2) at the contact portion 43 side base end of the elastic portion 44 is 1.5 mm.

TABLE 1

|  |  | Reference | Example 1 | Example 2 |
|---|---|---|---|---|
| Width dimension of Minimum width portion/Width dimension of Base end portion [%] |  | 100.0 | 90.0 | 80.0 |
| Electrical resistance value [mΩ] | Average value | 1.06 | 1.03 | 1.05 |
|  | Maximum value | 1.27 | 1.10 | 1.16 |
|  | Minimum value | 0.92 | 0.94 | 0.99 |
|  | Range | 0.35 | 0.16 | 0.17 |

TABLE 2

|  |  | Example 3 | Example 4 | Example 5 | Example 6 |
|---|---|---|---|---|---|
| Width dimension of Minimum width portion/Width dimension of Base end portion [%] |  | 70.0 | 60.0 | 50.0 | 40.0 |
| Electrical resistance value [mΩ] | Average value | 1.07 | 1.10 | 1.12 | 1.16 |
|  | Maximum value | 1.18 | 1.16 | 1.19 | 1.27 |
|  | Minimum value | 1.02 | 1.03 | 1.03 | 1.07 |
|  | Range | 0.16 | 0.13 | 0.16 | 0.20 |

As shown in Tables 1 and 2, it was confirmed that the breaker in Examples maintained a comparable electrical resistance value compared to Reference. In particular, it was confirmed that the breakers in the Examples 1 through 5 had electrical resistance values that were slightly different from that of the Reference. Therefore, when suppressing the electrical resistance between the terminals 22 and 42, it is preferred that the width dimension of the minimum width portion of the movable piece 4 is 50% or more of the width dimension of the base end portion. Further, it was confirmed that the breakers in the Examples had a smaller variation in the electrical resistance value than the Reference. Therefore, when suppressing the variation of the electrical resistance value between terminals 22 and 42, it is preferred that the width dimension of the minimum width portion of the movable piece 4 is 90% or less of the width dimension of the base end portion.

Figure 7:
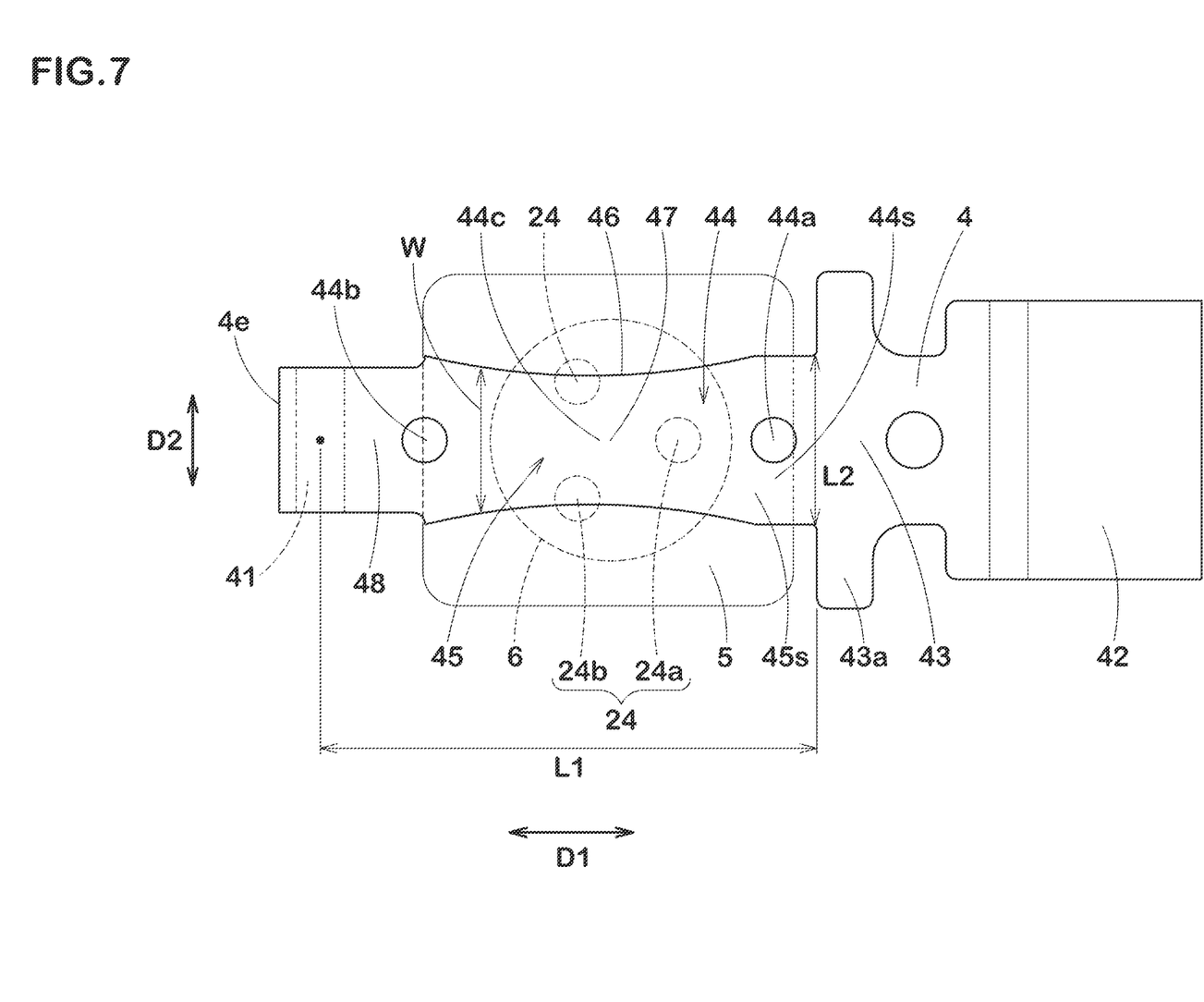
FIG. 7 A plan view of the above-described movable piece.

Further, ten breakers 1 each provided with the movable piece 4 shown in FIG. 7 were made by way of test according to the specifications in Table 2, and the operation of shifting the movable piece from the conductive state to the cut-off state was repeated 6000 times for each, then the amount of change in the operating temperature before and after the repetition was measured. It should be noted that the specifications of each of the movable pieces 4 are the same as above.

TABLE 3

|  | Reference | Example 1 | Example 2 |
|---|---|---|---|
| Width dimension of Minimum width portion/Width dimension of Base end portion [%] | 100.0 | 90.0 | 80.0 |
| Number of Repetition | 2000-3000 | 6000 | 6000 |
| Condition of Thermally actuated element | Damaged | No damage | No damage |

TABLE 3-continued

|  | Reference | Example 1 | Example 2 |
|---|---|---|---|
| Condition of Movable piece | No plastic deformation | No plastic deformation | No plastic deformation |
| Average value of Amount of change in Operating temperature [degree Celsius] | +6 or more | +1.2 | +1.3 |

TABLE 4

|  | Example 3 | Example 4 | Example 5 | Example 6 |
|---|---|---|---|---|
| Width dimension of Minimum width portion/Width dimension of Base end portion [%] | 70.0 | 60.0 | 50.0 | 40.0 |
| Number of Repetition | 6000 | 6000 | 6000 | 4000-6000 |
| Condition of Thermally actuated element | No damage | No damage | No damage | No damage |
| Condition of Movable piece | No plastic deformation | No plastic deformation | No plastic deformation | Plastically deformed |
| Average value of Amount of change in Operating temperature [degree Celsius] | +1.3 | +1.5 | +1.8 | +1.2 |

As shown in Tables 3 and 4, in the Reference, the thermally actuated element 5 was damaged after 2000 or more and less than 3000 repetitions, and the test was interrupted. The average value of the change in the operating temperature immediately before the thermally actuated element 5 got damaged was +6 degrees Celsius or more. In the Example 6, the movable piece 4 was plastically deformed after 4000 or more and less than 6000 repetitions, and the test was interrupted. The average value of the change in the operating temperature immediately before the plastic deformation of the movable piece 4 was +1.2 degree Celsius.

From the above, it was confirmed that the breakers in the Examples were superior in durability to repeated operation compared with the Reference. In particular, the breakers in the Examples 1 to 5 did not cause damage to the thermally actuated elements 5 or plastic deformation of the movable pieces 4, and the amounts of change in the operating temperature were small. Therefore, in order to obtain a breaker having excellent durability against repeated operations, it is preferred that the width dimension of the minimum width portion of the movable piece 4 is 50% or more and 90% or less of the width dimension of the base end portion. In particular, focusing on the amount of change in the operating temperature, it is more preferred that the width dimension of the minimum width portion of the movable piece 4 is 70% or more and 90% or less of the width dimension of the base end portion.

The breaker 1 according to the present invention can be embodied in various forms without being limited to the above-illustrated embodiment. That is, it suffices as long as the breaker 1 at least includes the fixed piece 2 having the fixed contact 21, the movable piece 4 having the plate-shaped and elastically deformable elastic portion 44 and the movable contact 41 which is formed at the tip portion of the elastic portion 44 and is pushed to be in contact with the fixed contact 21, the thermally actuated element 5 which deforms in accordance with a temperature change to thereby shift the state of the movable piece 4 from the conductive state in which the movable contact 41 is in contact with the fixed contact 21 to the cut-off state in which the movable contact 41 is separated from the fixed contact 21, and the case 10 which accommodates the fixed piece 2, the movable piece 4, and the thermally actuated element 5, wherein the movable piece 4 is cantilevered and supported by the case 10 on the base end portion (44s) side of the elastic portion 44, the elastic portion 44 includes a first narrow portion 45 having the smaller width dimension (W) in the short direction (D2) perpendicular to the longitudinal direction (D1) of the elastic portion 44 than that of the base end portion (44s), and the first narrow portion 45 has the arc-shaped contour 46 in a plan view seen from the thickness direction of the elastic portion 44.

For example, the joining method of the case main body 7 and the lid member 8 is not limited to ultrasonic welding, but can be appropriately applied as long as the two are firmly joined. For example, the two may be bonded together by applying or filling a liquid or gel-like adhesive and allowing it to cure. Further, the case 10 is not limited to the form composed of the case main body 7 and the lid member 8 or the like, and it suffices as long as the case is made up of two or more parts.

Furthermore, the movable piece 4 and the thermally actuated element 5 may be integrally formed by forming the movable piece 4 with a laminated metal such as a bimetal or a trimetal, or the like. In this case, the configuration of the breaker is simplified, therefore, the size of the breaker can be decreased.

Furthermore, the present invention can also be applied to an embodiment in which the movable piece and the terminal piece are separately molded and electrically connected by welding or the like, as shown in Japanese Unexamined Patent Application Publication No. 2016-35822, for example.

Although in the present embodiment, a self-holding circuit by the PTC thermistor 6 is provided, an embodiment in which such a configuration is omitted is also applicable.

Figure 5:
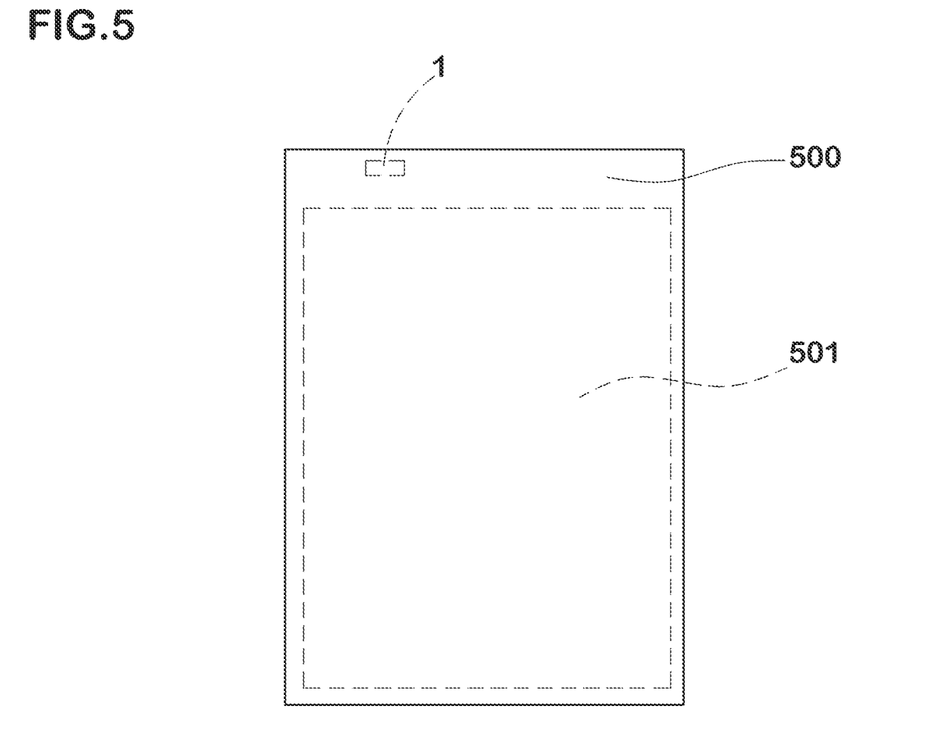
FIG. 5 A plan view showing a configuration of a secondary battery pack provided with the above-described breaker of the present invention.
Figure 6:
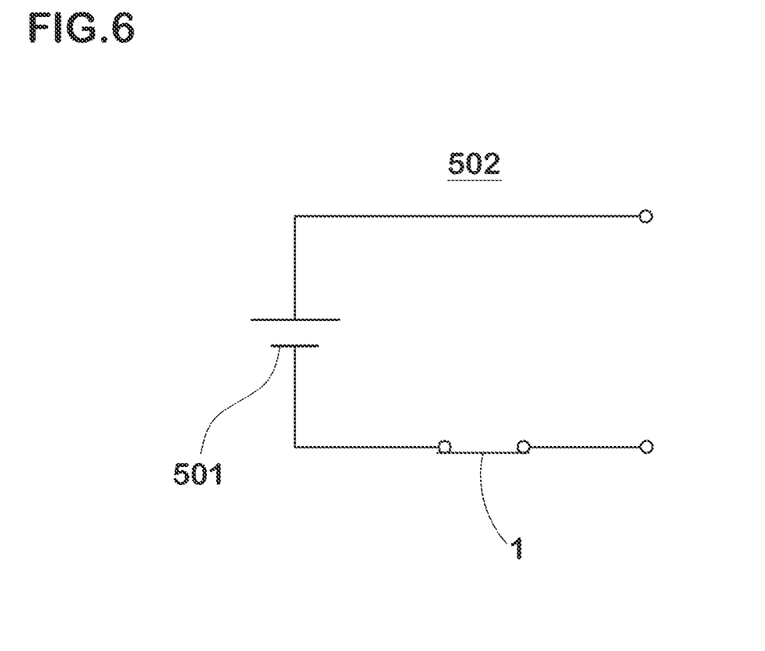
FIG. 6 A circuit diagram of a safety circuit provided with the above-described breaker of the present invention.

Furthermore, the breaker 1 of the present invention can be widely applied to a secondary battery pack, a safety circuit for an electrical device, and the like. FIG. 5 shows a secondary battery pack 500. The secondary battery pack 500 includes a secondary battery 501 and the breaker 1 provided in an output terminal circuit of the secondary battery 501. FIG. 6 shows a safety circuit 502 for an electrical device. The safety circuit 502 includes the breaker 1 in series in the output circuit of the secondary battery 501. According to the secondary battery pack 500 or the safety circuit 502 provided with the breaker 1, it is possible to manufacture the secondary battery pack 500 or the safety circuit 502 which can ensure good current interruption operation.

DESCRIPTION OF THE REFERENCE SIGNS

1: breaker
2: fixed piece
4: movable piece
5: thermally actuated element
10: case
21: fixed contact
24a: third protrusion
24b: fourth protrusion
41: movable contact
44: elastic portion
44a: first protrusion
44b: second protrusion 44c: middle
44s: base end portion
45: first narrow portion
45s: end edge
46: contour
47: minimum width portion
48: second narrow portion
501: secondary battery
502: safety circuit
D1: longitudinal direction
D2: short direction
W: width dimension

The invention claimed is:

1. A breaker comprising:
a fixed piece having a fixed contact;
a movable piece having a plate-shaped and elastically deformable elastic portion and a movable contact which is formed at a tip portion of the elastic portion and is pushed to be in contact with the fixed contact;
a thermally actuated element which deforms in accordance with a temperature change to thereby shift the state of the movable piece from a conductive state in which the movable contact is in contact with the fixed contact to a cut-off state in which the movable contact is separated from the fixed contact; and
a case which accommodates the fixed piece, the movable piece, and the thermally actuated element, wherein
the movable piece is cantilevered and supported by the case on a side of a base end portion of the elastic portion,
the elastic portion includes a first narrow portion having a width dimension in a short direction perpendicular to a longitudinal direction of the elastic portion,
the width dimension of the first narrow portion is smaller than a width dimension in the short direction of the base end portion,
the first narrow portion has an arc-shaped contour in a plan view seen from a thickness direction of the elastic portion,
the width dimension of the first narrow portion is gradually and continuously decreased with respect to the base end portion,
the elastic portion is provided with a first protrusion protruding toward the thermally actuated element on the side of the base end portion to be in contact with the thermally actuated element in the cut-off state, and a second protrusion protruding toward the thermally actuated element to be in contact with the thermally actuated element in the cut-off state and arranged closer to the tip portion than the first protrusion,
an end edge of the first narrow portion is arranged between the first protrusion and the second protrusion,
the end edge of the first narrow portion is arranged on the side of the base end portion of the elastic portion, and
a minimum width portion, at which the width dimension of the first narrow portion is the smallest, and a width dimension of the minimum width portion is 80% or more and 90% or less of the width dimension of the base end portion.

2. The breaker according to claim 1, wherein minimum width portion is located on the side of the base end portion of a middle in the longitudinal direction between the first protrusion and the second protrusion.

3. The breaker according to claim 2, wherein
a positive temperature coefficient thermistor is provided between the fixed piece and the thermally actuated element to conduct the fixed piece and the thermally actuated element,
the fixed piece is provided with a third protrusion protruding toward the thermally actuated element on the side of the base end portion to be in contact with the thermally actuated element, and a fourth protrusion protruding toward the thermally actuated element on the tip portion side from the third protrusion to be in contact with the thermally actuated element, and
the minimum width portion is located between the third protrusion and the fourth protrusion.

4. The breaker according to claim 3, wherein the positive temperature coefficient thermistor includes a ceramic sintered body containing barium titanate, strontium titanate or calcium titanate.

5. The breaker according to claim 2, wherein
the elastic portion has a second narrow portion arranged on the tip portion side of the first narrow portion and having a width dimension in the short direction perpendicular to the longitudinal direction of the elastic portion,
the width dimension of the second narrow portion is smaller than the width dimension of the first narrow portion, and
the movable contact is formed in the second narrow portion.

6. The breaker according to claim 2, wherein the first narrow portion has the arc-shaped contour on each side in the short direction.

7. A safety circuit for an electrical device comprising the breaker according to claim 1.

8. A secondary battery pack comprising the breaker according to claim 1.

9. The breaker according to claim 1, wherein
the movable piece is formed by a plate-shaped metal material, and the metal material includes copper as a main ingredient.

10. The breaker according to claim 1, wherein
the thermally actuated element is made by a laminate of two types of materials having different coefficients of thermal expansion, and
the two types of materials include nickel silver, brass, and stainless steel.

11. The breaker according to claim 10, wherein the laminate has a copper-nickel-manganese alloy on a high expansion side and an iron-nickel alloy on a low expansion side.

12. The breaker according to claim 10, wherein the laminate has an iron-nickel-chromium alloy on a high expansion side and an iron-nickel alloy on a low expansion side.

13. The breaker according to claim 10, wherein the laminate has an iron-nickel-chromium alloy on a high expansion side and an iron-nickel-cobalt alloy on a low expansion side.

14. The breaker according to claim 1, wherein the thermally actuated element is made by a laminate of three types of materials having different coefficients of thermal expansion.

* * * * *